United States Patent
Ogiso (10) Patent No.: US 11,114,967 B2
(45) Date of Patent: Sep. 7, 2021

(54) CONTROLLER OF ROTARY AXIS

(71) Applicant: FANUC CORPORATION, Yamanashi (JP)

(72) Inventor: Tarou Ogiso, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 10 days.

(21) Appl. No.: 16/859,739

(22) Filed: Apr. 27, 2020

(65) Prior Publication Data
US 2020/0382037 A1    Dec. 3, 2020

(30) Foreign Application Priority Data
May 30, 2019   (JP) .............................. JP2019-101388

(51) Int. Cl.
 *G05B 19/19*   (2006.01)
 *H02P 23/20*   (2016.01)

(52) U.S. Cl.
 CPC .......... *H02P 23/20* (2016.02); *H02P 2205/07* (2013.01)

(58) Field of Classification Search
 CPC ...... G05B 19/19; H02P 23/20; H02P 2205/07
 See application file for complete search history.

(56) References Cited

U.S. PATENT DOCUMENTS

2007/0138989 A1*   6/2007   Iwashita ................ G05B 19/19
                                                                   318/272

FOREIGN PATENT DOCUMENTS

JP         4099503 B2    6/2008
JP         5925066 B2    5/2016

* cited by examiner

*Primary Examiner* — Cortez M Cook
(74) *Attorney, Agent, or Firm* — Studebaker & Brackett PC (57) ABSTRACT

A controller of a rotary axis includes: a storage unit that stores data of a braking distance for each rotation number of the rotary axis and provides a current braking distance S3 corresponding to a current rotation number of the rotary axis; and a deceleration command calculating unit that calculates a speed command V2 of the rotary axis on a basis of the remaining movement amount S2 and the current braking distance S3; in which the deceleration command calculating unit maintains the current rotation number of the rotary axis in a case in which a difference S4 between the remaining movement amount S2 and the current braking distance S3 is equal to or greater than a predetermined value, and starts deceleration of the rotary axis in a case in which the difference S4 is less than the predetermined value.

8 Claims, 7 Drawing Sheets

CONTROLLER OF ROTARY AXIS

This application is based on and claims the benefit of priority from Japanese Patent Application No. 2019-101388, filed on 30 May, 2019, the content of which is incorporated herein by reference.

BACKGROUND OF THE INVENTION

Field of the Invention

The present invention relates to a controller of a rotary axis in a machine such as a machine tool.

Related Art

For example, in a machine tool, it has been demanded to stop a spindle (rotary axis) which is rotating at high speed, at any rotational position at high precision according to its purpose. For example, in order to perform tapping machining at a predetermined position on a workpiece by lathe, it is necessary to stop the spindle at a predetermined position. In addition, in a case of milling or contour control, the spindle is set to be in the positioning mode to command the position with a machining program, thereby automatically controlling the spindle position (the motion control during spindle positioning). When switching to the positioning mode, the spindle is rotating in many cases, and sometimes rotates at high speeds exceeding 10000 rpm. Japanese Patent Nos. 4099503 and 5925066 disclose technology for stopping the spindle (rotary axis) rotating at a high speed, at a desired position (predetermined position), for example, in the machine tool.
Patent Document 1: Japanese Patent No. 4099503 Patent Document 2: Japanese Patent No. 5925066

SUMMARY OF THE INVENTION

Thus, in the field of a controller of the rotary axis, it is desirable to reduce the time required for the rotary axis to decelerate to a predetermined speed at a predetermined position.

A controller of a rotary axis according to the disclosure that decelerates the rotary axis to a predetermined speed at a predetermined position, includes: a total movement command calculating unit that calculates a remaining movement amount S2 by subtracting a movement command M1 for each control cycle in every control cycle from a total movement amount S1 from a current position until the predetermined position, in a case in which a positioning request to decelerate the rotary axis to the predetermined speed at the predetermined position is issued; a movement command calculating unit that calculates the movement command M1 for each control cycle from the remaining movement amount S2; a storage unit that stores in advance data of a braking distance for each rotation number of the rotary axis, the data of the braking distance being based on a maximum torque characteristic with respect to a rotation number of a motor for driving the rotary axis, refers to the data of the braking distance, and provides a current braking distance S3 corresponding to a current rotation number of the rotary axis; a deceleration command calculating unit that calculates a speed command V2 of the rotary axis on a basis of the remaining movement amount S2 and the current braking distance S3; and a speed control unit that causes a speed of the motor to follow the speed command V2, in which the deceleration command calculating unit calculates the speed command V2 to maintain the current rotation number of the rotary axis in a case in which a difference S4 between the remaining movement amount S2 and the current braking distance S3 is equal to or greater than a predetermined value, and calculates the speed command V2 to start deceleration of the rotary axis in a case in which the difference S4 is less than the predetermined value.

According to the present disclosure, in the field of a controller of a rotary axis, it is possible to reduce the time required for the rotary axis to decelerate to a predetermined speed at a predetermined position.

DETAILED DESCRIPTION OF THE INVENTION

Hereinafter, a description will be given of an example of an embodiment of the present invention with reference to the attached drawings. It should be noted that the same reference numerals will be given to the same or equivalent parts in the drawings.

Figure 1:
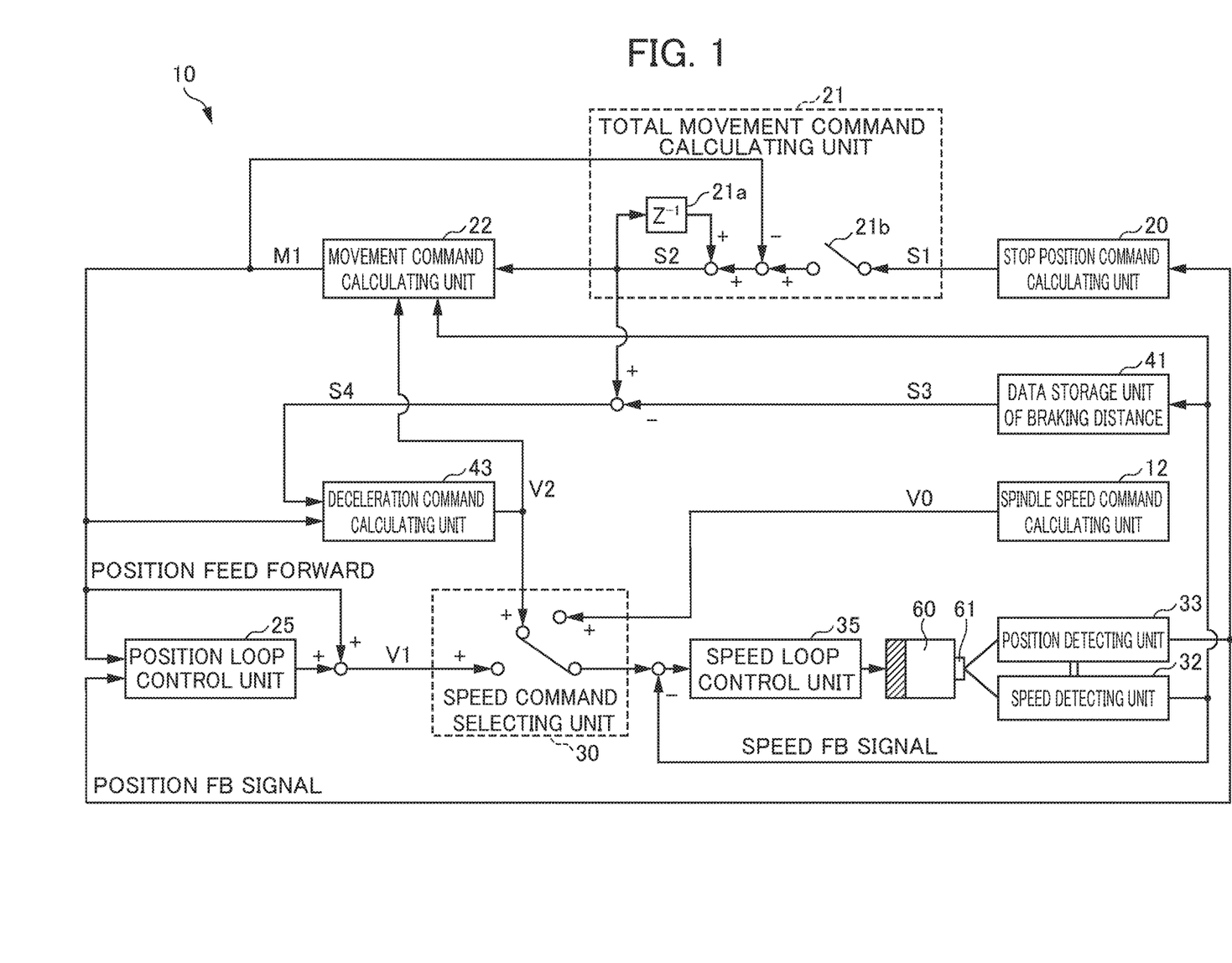
FIG. 1 is a diagram showing the configuration of a controller of a rotary axis according to the present embodiment.

FIG. 1 is a diagram showing the configuration of a controller of a spindle (rotary axis) in a machine tool according to the present embodiment. A controller 10 shown in FIG. 1 is, for example, a numerical control apparatus for controlling a spindle 61 (hereinafter, also referred to as a rotary axis) by controlling the spindle motor 60 in the machine tool. Some machine tools have a reduction mechanism by gears or a belt between the spindle motor and the spindle. However, in this example, for simplicity of explanation, it is assumed that the spindle motor and the spindle are directly connected, and the speed of the spindle motor and the spindle speed are equal.

In such a machine tool, the motor 60 may be, for example, a servo motor. Furthermore, for such a machine tool, for example, a speed detecting unit 32 for detecting the speed of the rotary axis 61 and a position detecting unit 33 for detecting a position with respect to the mechanical origin on the rotary axis 61 are provided.

The controller 10 includes a spindle speed command calculating unit 12, a stop position command calculating unit 20, a total movement command calculating unit 21, a movement command calculating unit 22, a position loop control unit (position control unit) 25, a speed command selecting unit 30, a speed loop control unit (speed control unit) 35, a data storage unit 41 of the braking distance, and a deceleration command calculating unit 43.

The controller 10 (except for the data storage unit 41) is, for example, composed of an arithmetic processor such as DSP (Digital Signal Processor) and FPGA (Field-Programmable Gate Array). Various functions of the controller 10 (except for the data storage unit 41) are realized by executing predetermined software (programs and applications) stored in the storage unit, for example. Various functions of the controller 10 (except for the data storage unit 41) may be realized by cooperation between hardware and software, or only by hardware (electronic circuits).

The data storage unit 41 in the controller 10 may be rewritable memory, e.g., EEPROM, or a rewritable disk, e.g., an HDD (Hard Disk Drive) or an SSD (Solid State Drive).

The controller 10 normally controls the speed of the spindle 61 on the basis of the speed command V0 calculated by the spindle speed command calculating unit 12. More specifically, the speed command selecting unit 30 normally selects the speed command V0 supplied from the spindle speed command calculating unit 12. The spindle speed command calculating unit 12 calculates, for example, the rotation number designated by the machining program or the rotation number of the spindle instructed by the PLC (Programmable Logic Controller) as the speed command V0.

The speed loop control unit 35 controls the speed of the spindle motor 60 so that the speed of the spindle 61 follows the speed command on the basis of the error between the speed command selected by the speed command selecting unit 30 and the speed FB signal detected by the speed detecting unit 32. More specifically, the speed loop control unit 35 calculates a drive current of the spindle motor 60.

Furthermore, the controller 10 has, for example, a function of stopping the rotary axis at a predetermined position (predetermined rotational position). More specifically, the speed command selecting unit 30 first selects the speed command V2 calculated by the deceleration command calculating unit 43 when a positioning request for stopping the rotary axis 61 at a predetermined position is issued. Thereafter, in a case in which the rotation number of the rotary axis 61 is equal to or less than a base rotation number of the motor 60 and it is in the phase matching completion state (details will be described later), the speed command selecting unit 30 selects the speed command V1 calculated by the position loop control unit 25.

The stop position command calculating unit 20, for example, calculates the total movement amount S1 from the current position to a predetermined position on the basis of a predetermined position given on the basis of the machining program and the position FB signal detected by the position detecting unit 33.

The total movement command calculating unit 21 calculates the remaining movement amount S2 on the basis of the total movement amount S1 and a movement command M1 for each control cycle, which will be described later. More specifically, the total movement command calculating unit 21 takes in the total movement amount S1 by closing a switch 21b only when the positioning request is issued. Furthermore, in the total movement command calculating unit 21, a subtractor subtracts the movement command M1 for each control period, and an integrating unit 21a and an adder add the remaining movement amount S2 in the previous control cycle for each control cycle. The total movement command calculating unit 21 calculates the remaining movement amount S2 in the present control cycle in this way.

The movement command calculating unit 22 calculates the movement command M1 for each control cycle from the remaining movement amount S2. The movement command calculating unit 22 uses the speed FB signal as an initial value of the speed command, for example. Alternatively, in a case in which the speed command is switched from V2 to V1 by the speed command selecting unit 30, the movement command calculating unit 22 uses V2 as the initial value of the speed command. For example, it is desirable for the movement command M1 to cause the waveform of the speed and the acceleration to continuously vary and the waveform is smoothed to suppress the mechanical vibration of the spindle.

The position loop control unit 25 calculates the speed command V1 so that the position of the rotary axis 61 coincides with a predetermined position on the basis of the positional error between the movement command M1 for each control cycle calculated by the movement command calculating unit 22 and the position feedback signal (the position FB signal) of the rotary axis 61 detected by the position detection unit 33. In order to increase the responsiveness of the position, position feed forward is generally used. The movement command M2 becomes the position feed forward as it is. The sum of the speed command and the position feed forward calculated by the position loop control unit 25 becomes the speed command V1 based on the position control.

Here, with reference to FIGS. 2 to 5, a description will be given of the positioning operation of the rotary axis described in Japanese Patent Nos. 4099503 and 5925066.

Figure 2:
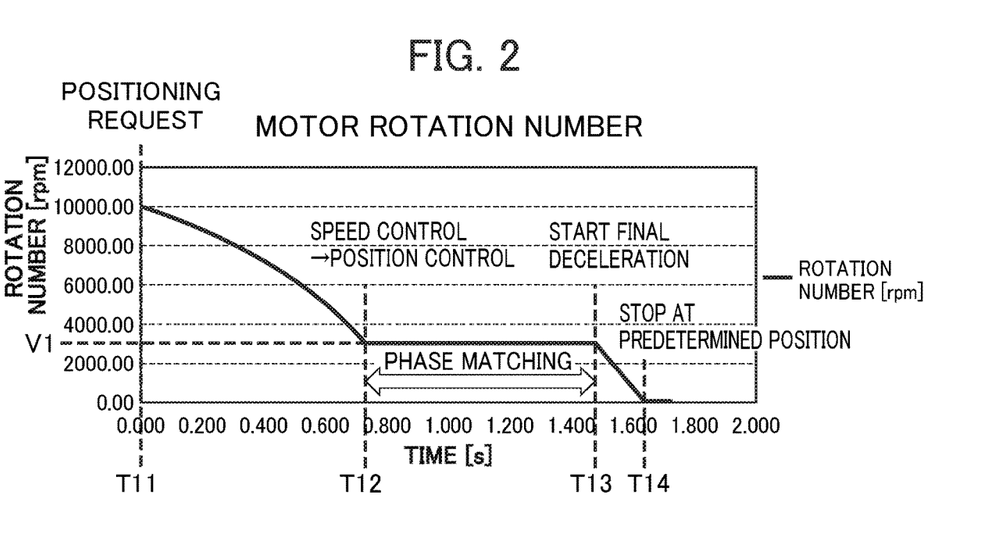
FIG. 2 is a diagram showing a positioning operation of a rotary axis described in Japanese Patent No. 4099503.

FIG. 2 is a diagram showing the positioning operation of the rotary axis described in Japanese Patent No. 4099503. As shown in FIG. 2, in the positioning operation of the rotary axis described in Japanese Patent No. 4099503, (i) when the positioning request is issued during the motor rotation (i.e., during the rotation of the rotary axis) (time T11), the deceleration of the motor (i.e., the rotary axis) to the predetermined rotation number V1 is performed at the full torque deceleration by the maximum acceleration based on the maximum torque characteristic with respect to the rotation number of the motor (the details will be described later in FIG. 3);

(ii) when the motor (i.e., the rotary axis) is lowered to the predetermined rotation number V1 (time T12), control is switched from the speed control to the position control, and the phase matching at a constant speed of the predetermined rotation number V1 (i.e., the rotation angle matching of the rotary axis) is performed; and (iii) the final deceleration is started at time T13, the deceleration of the motor at a constant deceleration based on the maximum torque characteristic (i.e., the rotary axis) is performed, and the rotary axis is stopped at a predetermined position at time T14.

Here, the phase matching refers to establishing the state of the remaining movement distance=the braking distance. When the phase matching is completed, it is possible to set the rotary axis at a predetermined speed at a predetermined position by decelerating the motor (i.e., the rotary axis) at the maximum acceleration based on the maximum torque characteristic. Here, it is assumed that the predetermined speed includes 0, i.e. the stop state.

Figure 3:
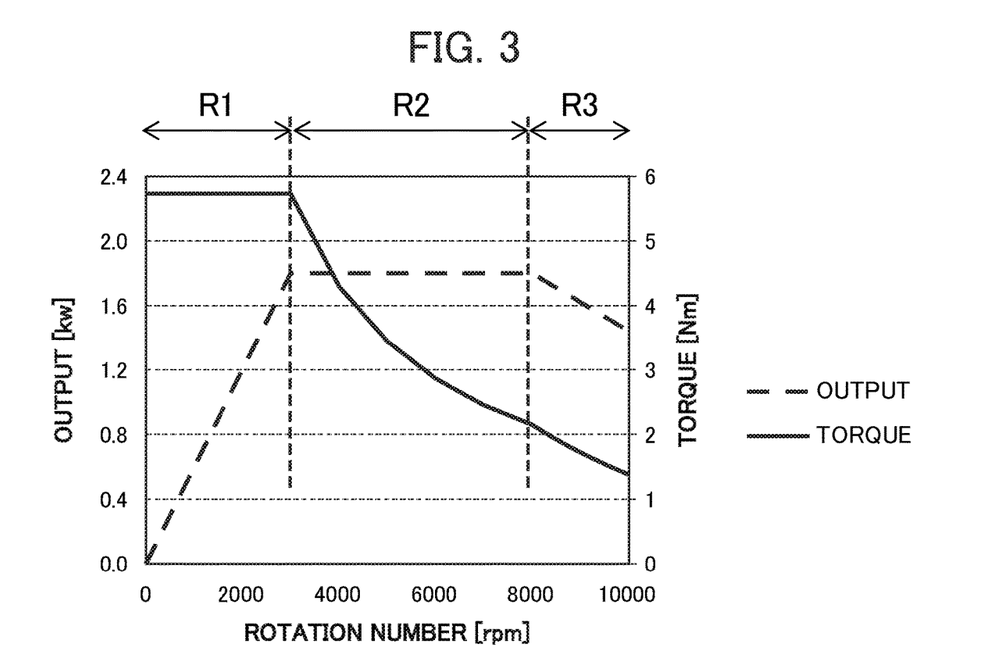
FIG. 3 is a diagram showing an example of the maximum torque characteristic and the maximum output characteristic with respect to the rotation number of a spindle motor.

FIG. 3 is a diagram showing an example of the maximum torque characteristic and the maximum output characteristic with respect to the rotation number of the spindle motor. In FIG. 3, the torque and output of the motor are represented as follows.

Torque [Nm]=Moment of Inertia [kgm$^2$]×Acceleration [rad/s$^2$]

Output [kW]=Torque [Nm]×Speed [rad/s]/1000

Speed [rad/s]=Rotation Number [RPM]×2π/60

It should be noted that the speed is an angular velocity and the acceleration is an angular acceleration.

In FIG. 3, the torque is constant in the low rotation region from the rotation speed of 0 rpm to 3000 rpm (hereinafter referred to as the constant torque region R1), the output is constant in the high rotation region from the rotation speed of 3000 rpm to 8000 rpm (hereinafter referred to as the constant output region R2), and the output and torque are reduced in the higher rotation region from the rotation speed of 8000 rpm (hereinafter referred to as the output gradually-decreasing region R3). The rotation number at the boundary between the constant torque region R1 and the constant output region R2 is the base rotation number. In the constant output region R2 and the output gradually-decreasing region R3, since the torque decreases as the rotation number increases, the acceleration is limited to a lower value as the rotation number becomes higher according to the above formula.

Figure 4:
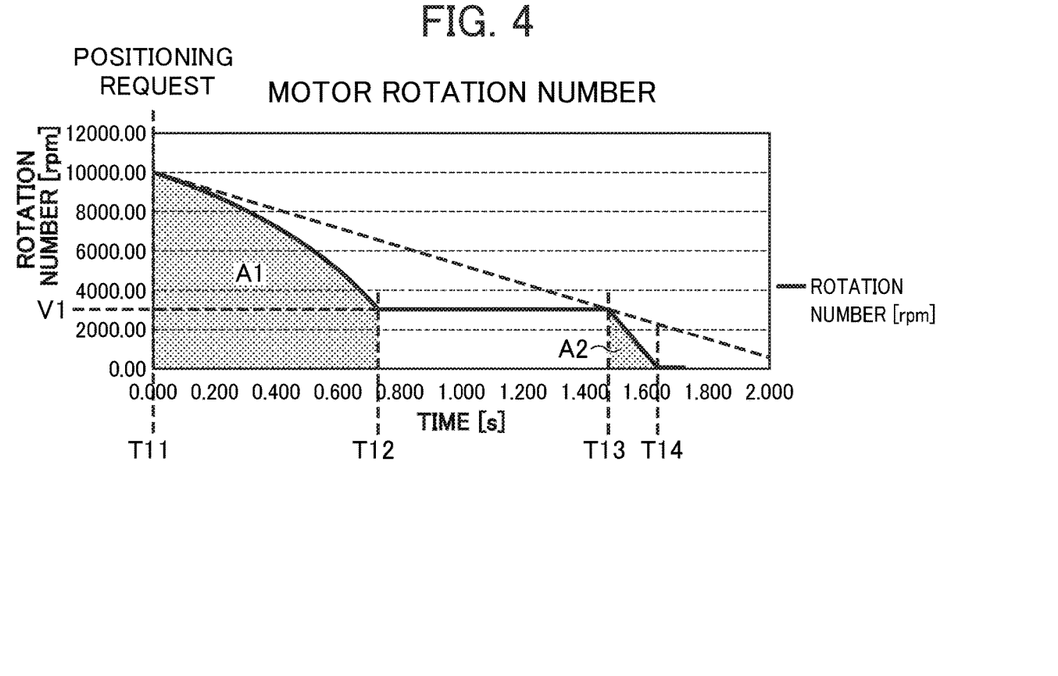
FIG. 4 is a diagram for explaining the positioning operation of the rotary axis described in Japanese Patent No. 4099503 shown in FIG. 2.

FIG. 4 is a diagram for explaining the positioning operation of the rotary axis described in Japanese Patent No. 4099503 shown in FIG. 2. In FIG. 4, the sum of the area A1 from time T11 to time T12 and the area A2 from time T13 to time T14 corresponds to the braking distance required for stopping at the maximum torque (the full torque) (or decelerating to a predetermined speed).

The period from time T11 to time T12 corresponds to the motor characteristic of the constant output region R2 or output gradually-decreasing region R3 shown in FIG. 3, and the slope of the rotation number characteristic continuously changes. Therefore, the calculation of the braking distance becomes complicated in the period from time T11 to time T12, and the calculation of the braking distance in the control cycle (in the order of milliseconds) increases the calculation load on the controller.

In a case of setting the predetermined rotation number V1 equal to or less than the base rotation number, the period from time T13 to time T14 corresponds to the motor characteristic of the constant torque region R1 shown in FIG. 3, and the slope of the rotation number characteristic is constant. Therefore, the braking distance can be easily and accurately calculated in the period from time T13 to time T14.

However, in the positioning operation of the rotary axis described in Japanese Patent No. 4099503, since the phase matching is performed at a relatively low predetermined rotation number V1, it takes time for the rotary axis to stop at a predetermined position. It should be noted that, when performing deceleration at a constant acceleration using a small acceleration at high rotation at the time of positioning request (time T11), the deceleration time is further increased (refer to the dotted straight line in FIG. 4).

Figure 5:
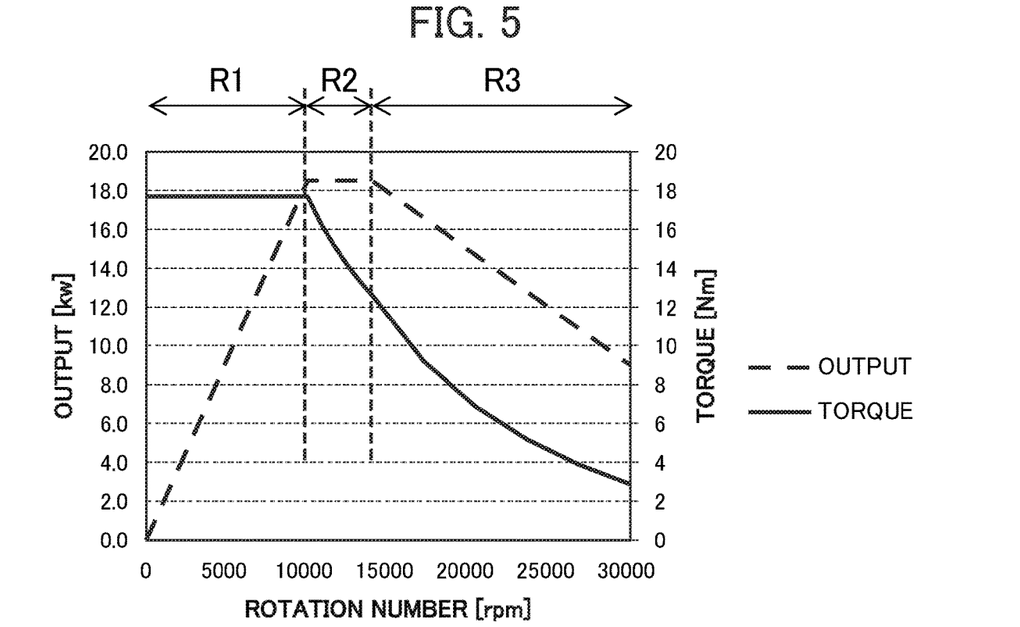
FIG. 5 is a diagram showing another example of the maximum torque characteristic and the maximum output characteristic with respect to the rotation number of the spindle motor.

Furthermore, in the positioning operation of the rotary axis described in Japanese Patent No. 5925066, in the constant output region R2 shown in FIG. 3, the rotary axis is stopped at a predetermined position while the deceleration of the rotary axis from the time of the positioning request is adjusted. However, in the spindle motor of the machine tool, sometimes a high rotation-type motor as shown in FIG. 5 is used. In such a high rotation-type motor, the output gradually-decreasing region R3 is widened, and the constant output region R2 is relatively narrowed. Japanese Patent No. 5925066 does not take into consideration the positioning operation of the rotary axis in the output gradually-decreasing region R3, and in the positioning operation of the rotary axis described in Japanese Patent No. 5925066, it is difficult to handle such a high rotation-type motor.

Figure 6:
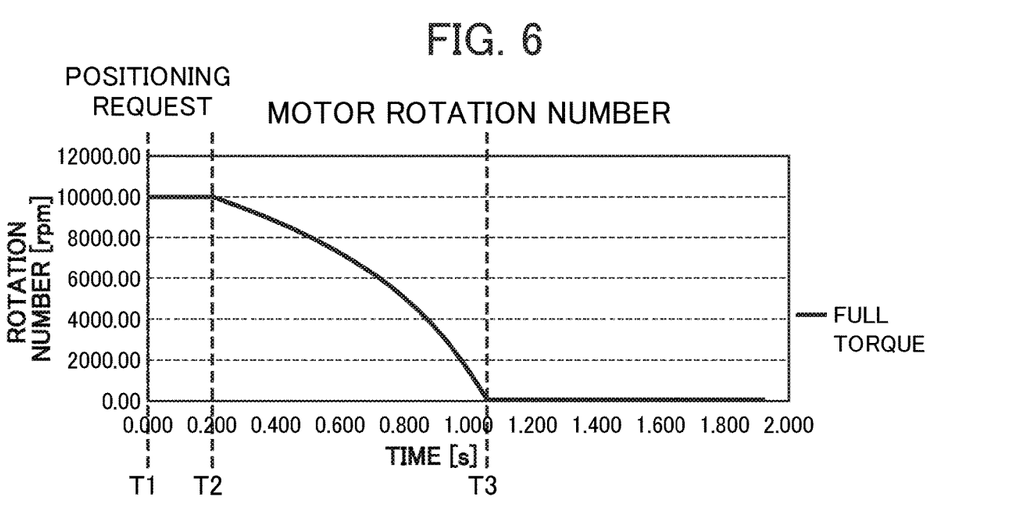
FIG. 6 is a diagram showing a positioning operation of the rotary axis of the present embodiment.

On the contrary, in the positioning operation of the rotary axis of the present embodiment, as shown in FIG. 6, (i) when the positioning request is issued during the rotation of the motor 60 (i.e., during the rotation of the rotary axis 61) (time T1), the rotation number of the rotary axis 61 at the time of the positioning request is maintained until the remaining movement amount S2 becomes the current braking distance S3 (i.e., the phase matching (the rotation angle matching of the rotary axis 61) is performed at a constant speed of the current high rotation number);

(ii) when the remaining movement amount S2 becomes the current braking distance S3 (time T2), the deceleration of the motor 60 (i.e., the rotary axis 61) is started at the full torque deceleration by the maximum acceleration based on the maximum torque characteristic; and (iii) in a case in which the rotation number of the rotary axis 61 is equal to or less than the base rotation number of the motor 60, and it is in the phase matching completion state, the final deceleration is started, the deceleration of the motor 60 (i.e., the rotary axis 61) is performed at a constant deceleration speed based on the maximum torque characteristic, and the rotary axis 61 is stopped at a predetermined position at time T3.

Figure 7:
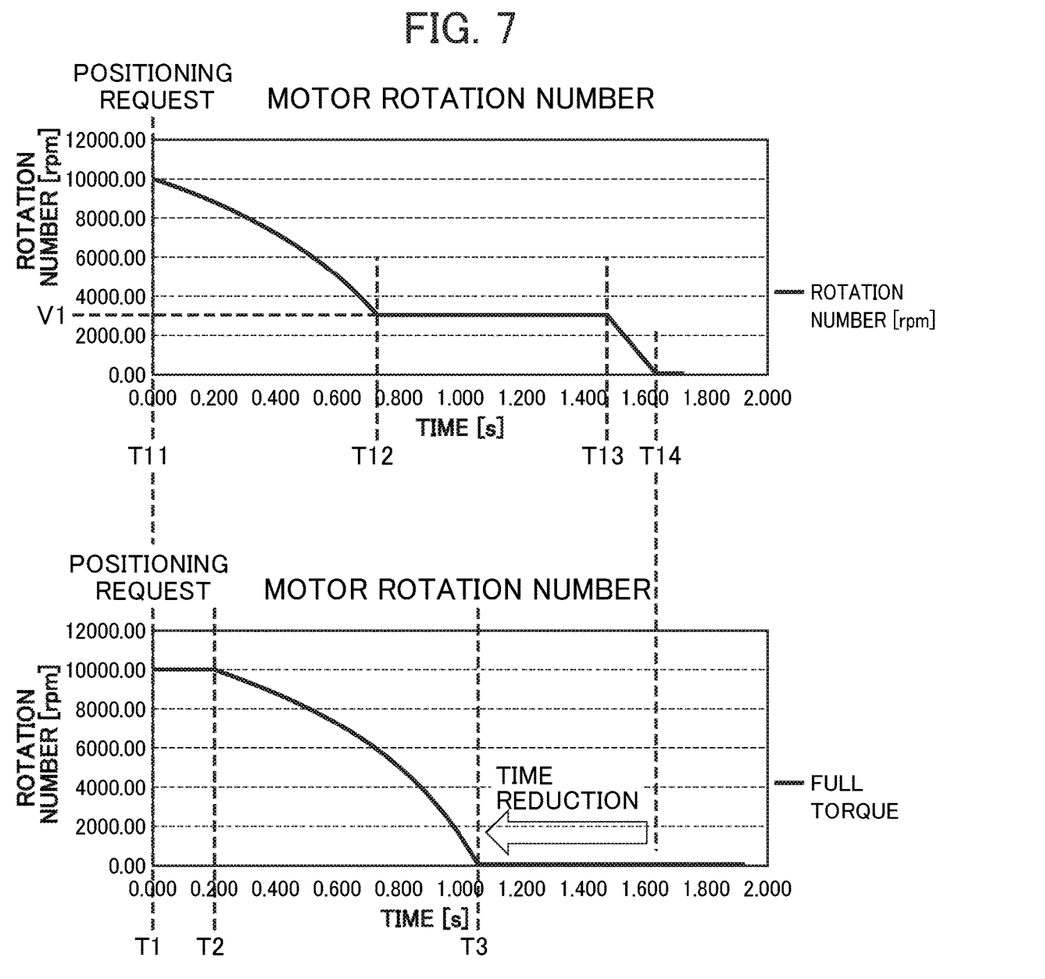
FIG. 7 is a diagram for comparing the positioning operation of the rotary axis of the present embodiment shown in FIG. 6 (lower figure) with the positioning operation of the rotary axis shown in FIG. 2 of Japanese Patent No. 4099503 (upper figure)

Thus, as shown in the lower figure of FIG. 7, for example, as compared with the upper figure which is a technique described in Japanese Patent No. 4099503, it is possible to reduce the time required for the rotary axis 61 is stopped at a predetermined position.

Hereinafter, a description will be given of the data storage unit 41 and the deceleration command calculating unit 43 for achieving this.

Figure 8:
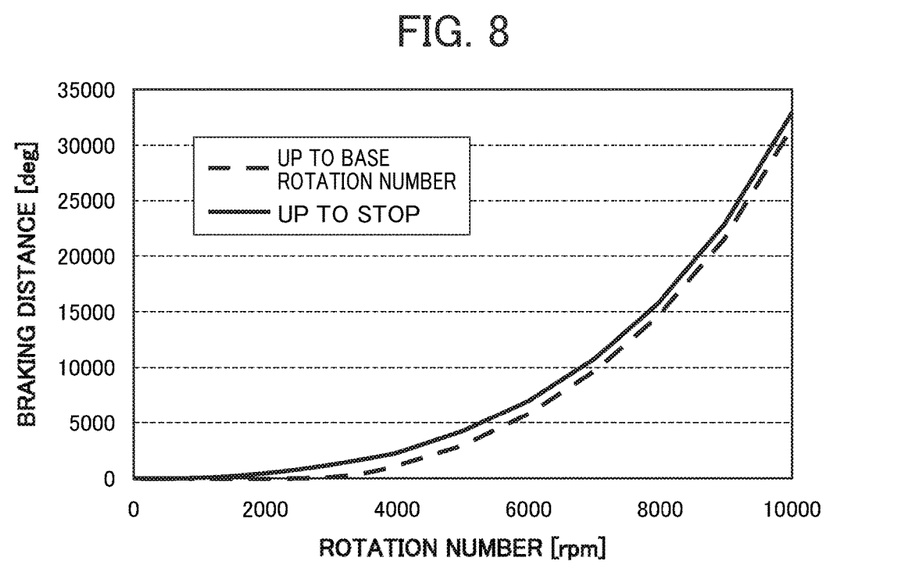
FIG. 8 is a diagram showing an example of the data of the braking distance for each rotation number of the rotary axis.

As shown by the solid line in FIG. 8, the data storage unit 41 stores, in advance, data of the braking distance for each rotation number of the rotary axis 61, that is, the data of the braking distance based on the maximum torque characteristic with respect to the rotation number of the motor 60 for driving the rotary axis 61. It should be noted that the data of the braking distance may be set larger than the braking distance based on the maximum torque characteristic of the motor 60. The braking distance is, for example, assumed to be stored in a table format of the rotation number of the rotary axis 61 and its braking distance. The braking distance data may be obtained from a database, simulation or test run. For example, by performing a test run to decelerate and stop the rotary axis 61 from the maximum rotation number at the maximum torque (the full torque) to calculate from the maximum torque characteristic and the moment of inertia with respect to the rotation number, the braking distance for each rotation number of the rotary axis 61 is obtained.

Furthermore, the data storage unit 41 refers to the data of the braking distance to calculate the current braking distance S3 corresponding to the current rotation number of the rotary axis 61. For example, the data storage unit 41 calculates the current braking distance S3 by interpolation by a straight line or quadratic or higher curve from the data of the braking distance in the table format on the basis of the speed FB signal from the speed detecting unit 32.

Furthermore, as shown in FIG. 3 or FIG. 5, the data storage unit 41 stores in advance the maximum torque characteristic with respect to the rotation number of the motor 60 for driving the rotary axis 61.

The deceleration command calculating unit 43 performs the following operations:

(i) when the positioning request is issued during the rotation of the rotary axis 61 (during the speed control), if the difference S4 between the remaining movement amount S2 and the current braking distance S3 is equal to or greater than a predetermined value, the speed command V2 is calculated so as to maintain the current rotation number of the rotary axis; and (ii) if the difference S4 between the remaining movement amount S2 and the current braking distance S3 is less than a predetermined value, the speed command V2 is calculated so as to start deceleration of the rotary axis 61 on the basis of the maximum torque characteristic of the motor 60. More specifically, in the case of (ii), the deceleration command calculating unit 43 performs the following operations:

when the difference S4 is less than or equal to zero (the phase matching completion status), the speed command V2 is calculated so as to perform full torque deceleration by the maximum acceleration based on the maximum torque characteristic of the motor 60; and if the difference S4 is greater than zero and less than a predetermined value, the speed command V2 is calculated so as to make the acceleration weaker than full torque deceleration.

Assuming that the speed command when decelerating at the maximum acceleration based on the maximum torque characteristic is V2', the speed command of the previous control cycle is Vold, and the control cycle is T, the predetermined values are set as follows, for example.

S5=(Vold−V2')×T

In this case, when S4>0 and S4<S5, if the acceleration is weakened as follows, the next control cycle is S4=0.

V2=V2'+S4/T

As described above, when the positioning request is issued, the speed command selecting unit 30 first selects the speed command V2 calculated by the deceleration command calculating unit 43, the deceleration of the rotary axis 61 starts on the basis of the speed command V2.

After that, (iii) in a case in which the rotation number of the rotary axis 61 is equal to or less than the base rotation number of the motor 60 and it is in the phase matching completion state (S2=S3, that is, S4=0), the speed command selecting unit 30 selects the speed command V1 calculated by the position loop control unit 25, that is, the speed command V1 whose acceleration based on the maximum torque characteristic of the motor is constant. Thus, the final deceleration starts, the deceleration of the motor 60 is performed at a constant deceleration based on the maximum torque characteristic (i.e., the rotary axis 61), and the rotary axis 61 is stopped at a predetermined position.

As described above, according to the controller 10 of the rotary axis of the present embodiment, it is possible to directly position the spindle (the rotary axis) 61, which is rotating at high speed, at a predetermined position. Since the deceleration is generally made at the maximum torque (the full torque), the deceleration time becomes shorter as compared to the prior art. Thus, when switching from the spindle mode in which the rotation number of the spindle in rotation is a control target to the positioning mode in which the stop at a predetermined position is a control target, the deceleration time of the spindle is shortened. Therefore, it is particularly effective in shortening the machining time for the machining in which the switching from the spindle mode to the positioning mode is frequently performed.

In the controller of the rotary axis described above, although the configuration of stopping the rotary axis at a predetermined position is exemplified, it may be a configuration decelerating the rotary axis to a predetermined speed at a predetermined position. For example, as shown in FIGS. 2 and 4, the Applicant devises a configuration to decelerate at a constant acceleration from the base rotation number in the period from time T13 to time T14 on the basis of the constant torque region R1 of the maximum torque characteristic shown in FIG. 3. Thus, in a case in which the braking distance data for decelerating at a constant acceleration from the base rotation number has already been calculated, as shown by the dotted line in FIG. 8, the braking distance data to be newly calculated may be the braking distance data until the rotary axis decelerates to the base rotation number (a predetermined speed) at a predetermined position.

According to this, it is possible to reduce the time required for the rotary axis to decelerate to a predetermined speed at a predetermined position.

Modification Example 1

The braking distance data may be overestimated so that the rotary axis does not move past a predetermined position (a predetermined rotational position). That is, the braking distance data may be further set larger than the braking distance based on the maximum torque characteristic of the motor shown in FIG. 3, for example.

In this case, the deceleration of only the maximum torque (the full torque) may complete the deceleration before the predetermined position. Therefore, as shown in FIG. 9, the deceleration command calculating unit 43 sequentially verifies the remaining movement amount S2 and the current braking distance S3 even after the deceleration starts at time T2, and in a case in which the difference S4 between the remaining movement amount S2 and the current braking distance S3 is greater than zero and less than a predetermined value, an adjustment may be sequentially performed so as to temporarily weaken the acceleration of the deceleration of the rotary axis (in FIG. 9, a dotted→solid line).

Modification Example 2

Figure 10:
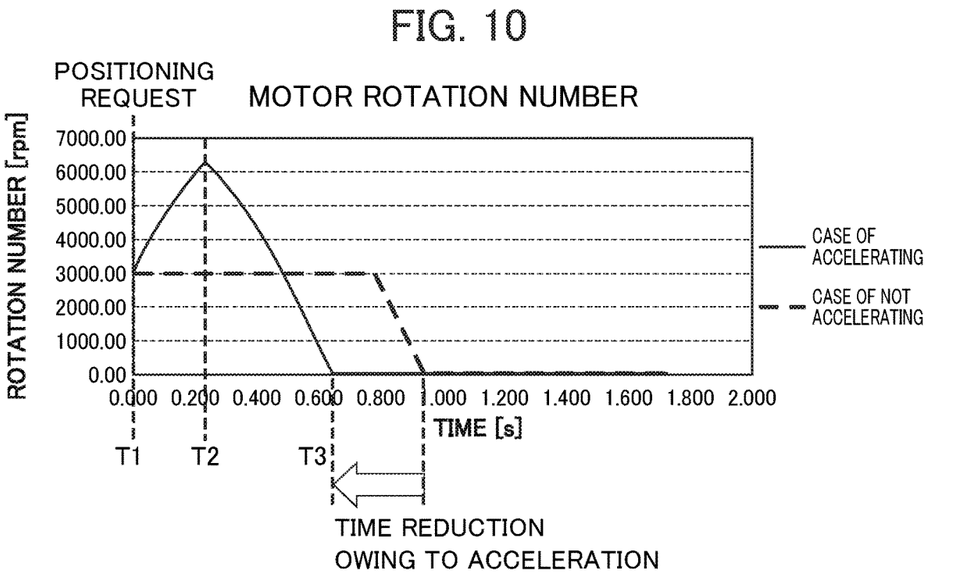
FIG. 10 is a diagram showing a positioning operation of a rotary axis of Modification Example 2.

As shown in FIG. 10, in a case in which, when the positioning request is issued (time T1), the current rotation number of the rotary axis 61 is low (e.g., in the case of being equal to or lower than a predetermined value (a second predetermined value) that is set to 80% or less of the maximum rotation number in the braking distance data), the deceleration command calculating unit 43 may perform the phase matching while accelerating the rotary axis 61 at the maximum acceleration based on the maximum torque characteristic of the motor 60. In this case, the deceleration command calculating unit 43 may provide an upper limit value to the rotation number of the rotary axis 61 that can be accelerated, for example. For example, examples of the upper limit value include the maximum rotation number in the braking distance data.

Figure 9:
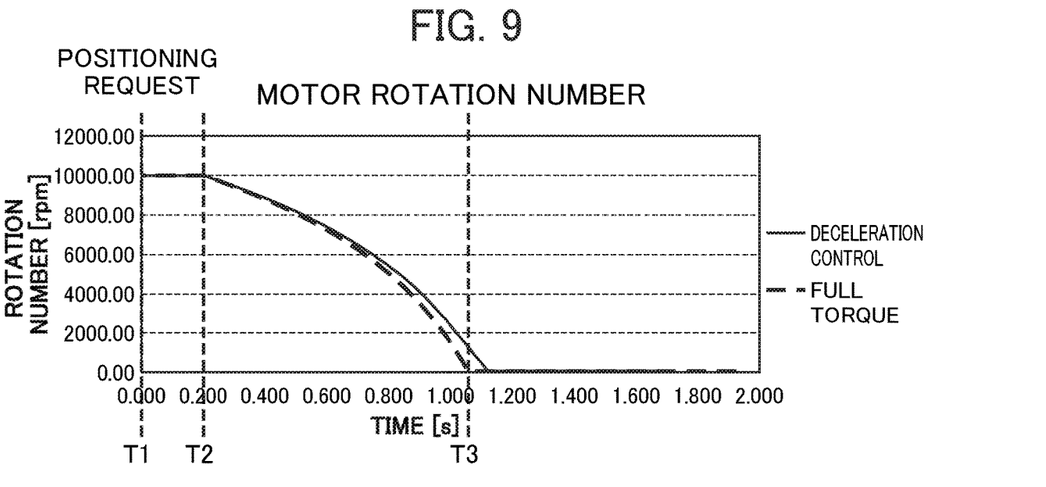
FIG. 9 is a diagram showing a positioning operation of a rotary axis of Modification Example 1.

It should be noted that, although the example of the deceleration starting before reaching the upper limit value is shown in FIG. 10, after reaching the upper limit value, similarly to the period from time T1 to time T2 in FIG. 6 or FIG. 9, it is sufficient to maintain the rotation number of the rotary axis 61 at the time of the positioning request (i.e., it is sufficient to perform the phase matching at a constant speed of the current high rotation number (rotation angle matching of the rotary axis 61)) until the difference S4 between the remaining movement amount S2 and the current braking distance S3 becomes less than a predetermined value at a constant speed.

According to this, it is possible to further reduce the time required for the rotary axis 61 to be stopped at a predetermined position.

Modification Example 3

Figure 11:
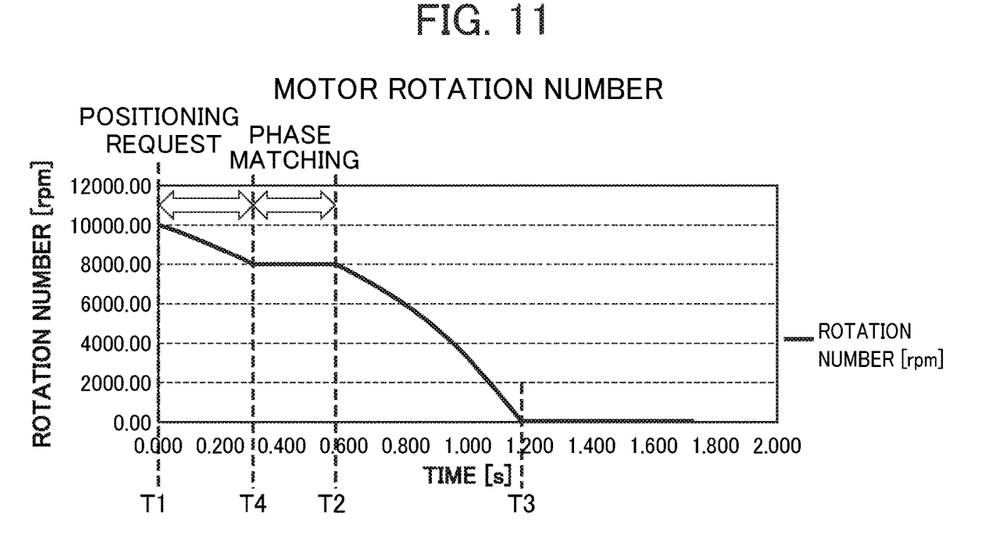
FIG. 11 is a diagram showing a positioning operation of a rotary axis of Modification Example 3.

In a case in which there is no braking distance corresponding to the current rotation number of the rotary axis 61 in the braking distance data, as shown in the period from the time T1 to time T4 in FIG. 11, the position loop control unit 25 may perform the phase matching while performing the deceleration of the rotary axis 61 at a maximum acceleration based on the maximum torque characteristic of the motor 60 up to the rotation number corresponding to the braking distance present in the braking distance data.

In this case, the braking distance data stored in the data storage unit 41 may be updated so as to add the braking distance based on the maximum torque characteristic with prespect to the rotation number at the deceleration of the rotary axis 61 of the period from time T1 to time T4. Thus, in the second and subsequent times, it is possible to perform the phase matching with the rotation number at the time of the positioning request.

Although embodiments of the present invention have been described above, the present invention is not to be limited to the embodiments described above, and various modifications and variations are possible. For example, although the above-described embodiment exemplifies a controller for stopping a spindle (a rotary axis) in a machine tool at a predetermined position, the present disclosure is not limited thereto and is applicable to a controller for stopping the rotary axis in various machines at a predetermined position. In addition, the present disclosure is applicable to a controller that decelerates a rotary axis in various machines to a predetermined speed at a predetermined position.

EXPLANATION OF REFERENCE NUMERALS 10 controller
12 spindle speed command calculating unit
20 stop position command calculating unit
21 total movement command calculating unit
22 movement command calculating unit
25 position loop control unit (position control unit)
30 speed command selecting unit
32 speed detecting unit
33 position detecting unit
35 speed loop control unit (speed control unit)
41 data storage unit of braking distance
43 deceleration command calculating unit
60 motor
61 rotary axis

What is claimed is:

1. A controller of a rotary axis that decelerates the rotary axis to a predetermined speed at a predetermined position, the controller comprising:

a total movement command calculating unit that calculates a remaining movement amount S2 by subtracting a movement command M1 for each control cycle in every control cycle from a total movement amount S1 from a current position until the predetermined position, in a case in which a positioning request to decelerate the rotary axis to the predetermined speed at the predetermined position is issued;

a movement command calculating unit that calculates the movement command M1 for each control cycle from the remaining movement amount S2;

a storage unit that stores in advance data of a braking distance for each rotation number of the rotary axis, the data of the braking distance being based on a maximum torque characteristic with respect to a rotation number of a motor for driving the rotary axis, refers to the data of the braking distance, and provides a current braking distance S3 corresponding to a current rotation number of the rotary axis;

a deceleration command calculating unit that calculates a speed command V2 of the rotary axis on a basis of the remaining movement amount S2 and the current braking distance S3; and a speed control unit that causes a speed of the motor to follow the speed command V2, wherein the deceleration command calculating unit calculates the speed command V2 to maintain the current rotation number of the rotary axis in a case in which a difference S4 between the remaining movement amount S2 and the current braking distance S3 is equal to or greater than a predetermined value, and calculates the speed command V2 to start deceleration of the rotary axis in a case in which the difference S4 is less than the predetermined value.

2. The controller of the rotary axis according to claim 1, wherein the data of the braking distance is set larger than a braking distance based on the maximum torque characteristic of the motor, and the deceleration command calculating unit calculates the speed command V2 to perform full torque deceleration by a maximum acceleration based on the maximum torque characteristic of the motor, in a case in which the difference S4 is equal to or less than zero, and calculates the speed command V2 to make acceleration weaker than the full torque deceleration, in a case in which the difference S4 is greater than zero and less than the predetermined value.

3. The controller of the rotary axis according to claim 2, wherein the deceleration command calculating unit sequentially adjusts acceleration of deceleration of the rotary axis in a case in which the difference S4 is greater than zero and less than the predetermined value after a start of the deceleration.

4. The controller of the rotary axis according to claim 1, wherein the deceleration command calculating unit performs acceleration of the rotary axis at acceleration based on the maximum torque characteristic of the motor, in a case in which the current rotation number of the rotary axis is equal to or less than a second predetermined value.

5. The controller of the rotary axis according to claim 4, wherein the deceleration command calculating unit performs acceleration of the rotary axis up to an upper limit value of the rotation number of the rotary axis.

6. The controller of the rotary axis according to claim 1, wherein the deceleration command calculating unit performs deceleration of the rotary axis at acceleration based on the maximum torque characteristic of the motor up to a rotation number corresponding to a braking distance present in the data of the braking distance, in a case in which a braking distance corresponding to the current rotation number of the rotary axis in the data of the braking distance.

7. The controller of the rotary axis according to claim 6, wherein the storage unit updates the data of the braking distance to follow a braking distance based on a maximum torque characteristic with respect to a rotation number in the deceleration of the rotary axis.

8. The controller of the rotary axis according to claim 1, further comprising: a position control unit that calculates a speed command V1 on a basis of the movement command M1; and a speed command selecting unit that selects either one of the speed command V1 or the speed command V2 and provides to the speed control unit, wherein the speed command selecting unit selects the speed command V2 when the positioning request is issued, and subsequently selects the speed command V1 for which the acceleration based on the maximum torque characteristic of the motor becomes constant, in a case in which the rotation number of the rotary axis is equal to or less than a base rotation number of the motor, and being a phase matching completion state in which the difference S4 between the remaining movement amount S2 and the current braking distance S3 is zero.

\* \* \* \* \*